(12) United States Patent
Walker

(10) Patent No.: US 10,817,907 B2
(45) Date of Patent: Oct. 27, 2020

(54) DIGITAL ADVERTISEMENT DISPLAY STAND

(71) Applicant: Brian B. Walker, Big Lake, MN (US)

(72) Inventor: Brian B. Walker, Big Lake, MN (US)

( * ) Notice: Subject to any disclaimer, the term of this patent is extended or adjusted under 35 U.S.C. 154(b) by 0 days.

(21) Appl. No.: 14/955,208

(22) Filed: Dec. 1, 2015

(65) Prior Publication Data
US 2016/0086229 A1 Mar. 24, 2016

Related U.S. Application Data

(63) Continuation-in-part of application No. 13/747,687, filed on Jan. 23, 2013, now abandoned.

(60) Provisional application No. 61/632,223, filed on Jan. 19, 2012.

(51) Int. Cl.
| | |
|---|---|
| *G06Q 30/02* | (2012.01) |
| *A47F 7/00* | (2006.01) |
| *A47F 3/04* | (2006.01) |
| *A47F 5/00* | (2006.01) |
| *A47F 5/10* | (2006.01) |
| *G06F 1/16* | (2006.01) |
| *G09F 27/00* | (2006.01) |

(52) U.S. Cl.
CPC .......... *G06Q 30/0267* (2013.01); *A47F 3/04* (2013.01); *A47F 5/0025* (2013.01); *A47F 5/108* (2013.01); *A47F 7/0071* (2013.01); *G06F 1/1601* (2013.01); *G09F 27/00* (2013.01); *A47F 2003/0473* (2013.01)

(58) Field of Classification Search
None
See application file for complete search history.

(56) References Cited

U.S. PATENT DOCUMENTS

| | | | | |
|---|---|---|---|---|
| 5,201,191 A | * | 4/1993 | Bustos | A47F 5/101 211/187 |
| 2004/0055982 A1 | * | 3/2004 | Jennings | A47F 3/14 211/126.2 |
| 2004/0103028 A1 | * | 5/2004 | Littman | G06Q 30/02 705/14.52 |
| 2008/0077422 A1 | * | 3/2008 | Dooley | G06Q 30/02 705/26.1 |
| 2008/0300985 A1 | * | 12/2008 | Shamp | G06Q 30/02 705/14.64 |
| 2011/0234514 A1 | * | 9/2011 | Gothard | G06Q 30/02 345/173 |
| 2014/0172523 A1 | * | 6/2014 | Stob | A47K 5/1217 705/14.4 |

(Continued)

*Primary Examiner* — Alexandru Cirnu
(74) *Attorney, Agent, or Firm* — Johnson and Phung LLC; Thomas N. Phung

(57) ABSTRACT

A digital advertisement display stand comprising a product display unit having multiple spaces for supporting, displaying, and advertising goods and services, at least one static display located on the product display unit, at least one live action monitor located on the product display unit with the live action monitor having a touch screen, a central processing unit located in the live action monitor, a memory storage unit connected to the central processing unit, and a long distance wireless data transmission device connected to the central processing unit and at least one offsite control center in wireless communication with the long distance wireless data transmission device of the live action monitor.

2 Claims, 8 Drawing Sheets

(56) References Cited

U.S. PATENT DOCUMENTS

2014/0232320 A1\* 8/2014 Ento July ............. H02J 7/0027
320/101

\* cited by examiner

DIGITAL ADVERTISEMENT DISPLAY STAND

CROSS REFERENCE TO RELATED APPLICATIONS

This application is a continuation-in-part of currently pending U.S. application Ser. No. 13/747,687; filed Jan. 23, 2013; titled DIGITAL ADVERTISING CELLULAR DISPLAY SYSTEM, which claims priority to currently U.S. Provisional Application Ser. No. 61/632,223; filed Jan. 23, 2012; titled DIGITAL ADVERTISING CELLULAR DISPLAY SYSTEM.

FIELD OF THE INVENTION

This invention relates to product and services advertisement and product and services information and more specifically to a digital advertisement display stand.

STATEMENT REGARDING FEDERALLY SPONSORED RESEARCH OR DEVELOPMENT

None

REFERENCE TO A MICROFICHE APPENDIX

None

SUMMARY OF THE INVENTION

The present invention comprises a digital advertisement display stand that includes a product display unit located proximal a location for displaying goods and services such as in a frozen or produce grocery aisle with the product display unit having multiple spaces for supporting, displaying, and advertising goods and services. The product display unit includes at least one static display located on the product display unit and at least one live action monitor connected to the product display unit. A feature of the live action monitor is that the live action monitor may include a touch screen, a central processing unit located in the live action monitor, a memory storage unit connected to the central processing unit, a long distance wireless data transmission device connected to the central processing unit, a motion-sensing device allowing the display of content when consumers are nearby to reduce power consumption, and a short distance wireless data transmission device providing for short wireless communication between the live action monitor and a consumer's mobile device and at least one offsite control center in wireless communication with the long distance wireless data transmission device of the live action monitor.

The present invention further comprises a digital advertisement display stand that includes a product display unit located adjacent a location for displaying goods and services with the product display unit having a base supporting the product display unit on a support surface. The product display unit also includes a live action monitor connected to the product display unit with the live action monitor located within a customer's line of vision when in use and supported on the support surface. The live action monitor may include a touch screen, a central processing unit located in the live action monitor, a memory storage unit connected to the central processing unit, a long distance wireless data transmission device connected to the central processing unit, a motion-sensing device allowing the display of content when consumers are nearby to reduce power consumption, and a short distance wireless data transmission device providing for short wireless communication between the live action monitor and a consumer's mobile device. The product display unit also includes at least one static display located on the product display unit between the base and the live action monitor and at least one offsite control center in wireless communication with the long distance wireless data transmission device of the live action monitor.

The present invention further comprises a digital advertising cellular display system that includes a retail outlet having at least one location for displaying goods and services for purchase and at least one electronic display means located proximal the location for displaying goods and services with the electronic display means displaying consumer information images, videos, and audios therefrom. The electronic display means includes a central processing unit located therein, a memory storage unit located therein and connected to the central processing unit, and a wireless data transmission device located therein and connected to the central processing unit. The digital advertising cellular display system also includes at least one offsite control center in wireless communication with the wireless data transmission device for transferring control information and product and services advertisement and product and services information between said offsite control center and said wireless data transmission device.

DESCRIPTION OF THE PREFERRED EMBODIMENT

In the field of providing consumers information about products, a large number of methods and devices exist to convey information about potential purchases.

Unfortunately, most of these devices and methods are physical in nature, such as cards and placards placed around products.

One of the drawbacks of physical methods and devices to convey information to potential consumers is the static nature of the devices. Since price changes, availability changes, comparison information changes, all must be done manually, and at each physical location where a physical information device exists. The process of changing these devices to update current conditions is time consuming and laborious. If a retailer, producer, manufacturer or other trader of goods has outlets in multiple locations this process of changing physical information devices can become extremely laborious. The aforementioned process of changing physical information is also prone to the introduction of errors due to the volume of information being changed. That is, information at one retail outlet may be different than at another retail outlet as multiple individuals are likely to be involved changing the physical information. A further disadvantage is that the consumer often lacks control of the information being displayed.

It is a further object of this invention to create an information system wherein the information that the system conveys can be changed rapidly, uniformly, and globally, to allow an information manager easy and quick access to know what his or her customers are viewing. It is a further object of this invention to create an information projection system wherein the images projected can be altered from a remote location. It is a further object of this invention to create an information system wherein the images and information conveyed to consumer can be specifically tailored and or modified for that specific consumer on demand.

Figure 1:
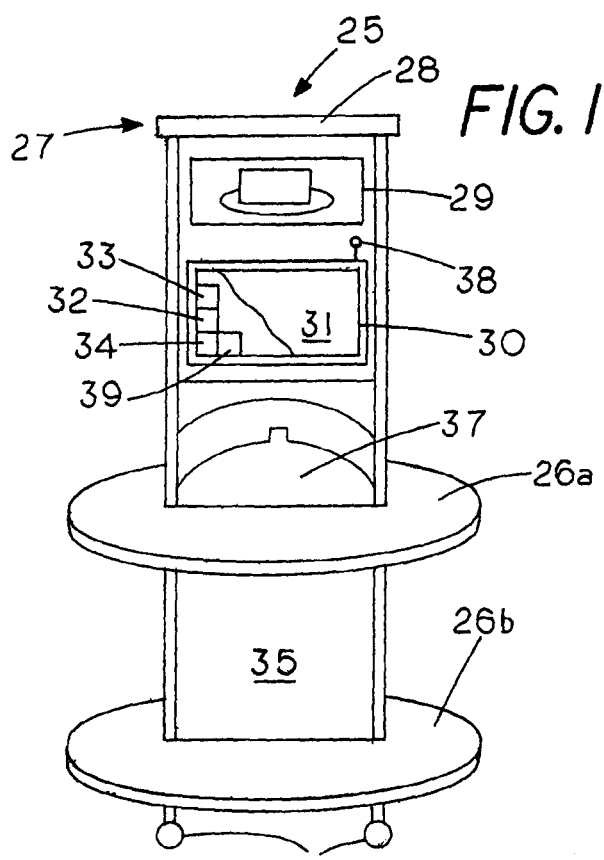
FIG. 1 is a front view showing a digital advertisement display stand comprising a portable sampling station.

FIG. 1 is a front view showing an embodiment of a digital advertisement display stand of the present invention comprising a portable sampling station 25 for displaying, promoting and advertising goods at retail outlet location. Portable sampling station 25 includes a countertop 26a supporting a food sampling/display tray 37 thereon and a lower shelf 26b for supporting, displaying, and advertising goods and services thereon.

Portable sampling station 25 includes a top portion 27 housing a rechargeable lithium battery power supply 28 therein for powering portable sampling station 25 and all electrical component connected to portable sampling station 25. In addition portable sampling station 25 may also include a power connector jack for connecting portable sampling station 25 to a building outlet. Located between top portion 27 and countertop 26a is a static display 29 and a live action monitor 30 with live action monitor 30 position within a customer's line of vision. Located between countertop 26a and lower shelf 26b is a second static display 35 and located underneath lower shelf 26b is a set of lockable wheels 36 for moving portable sampling station 25 between locations for displaying goods and services for purchase.

In the embodiment of FIG. 1 live action monitor 30 generally comprises a touch screen 31, a central processing unit (CPU) 32 located within live action monitor 30, a memory storage unit 33 connected to central processing unit 32, and a long distance wireless data transmission device 34 such as but not limited to Extended range wireless technology, cellular technology, and radio frequency technology connected to central processing unit 32 for wireless communication with at least one control center that is located offsite from the retail outlet location. It is noted that memory storage unit 33 may comprise but is not limited to flash memory storage drives and solid-state memory storage drives or the like.

Live action monitor 30 may also include a motion-sensing device 38 allowing the display of content when consumers are nearby to reduce power consumption, and a short distance wireless data transmission device 39 such as but not limited to Near Field Communication (NFC) technology and Bluetooth technology providing for short wireless communication between live action monitor 30 and a consumer's mobile device such as a cellular phone or tablet.

Figure 2:
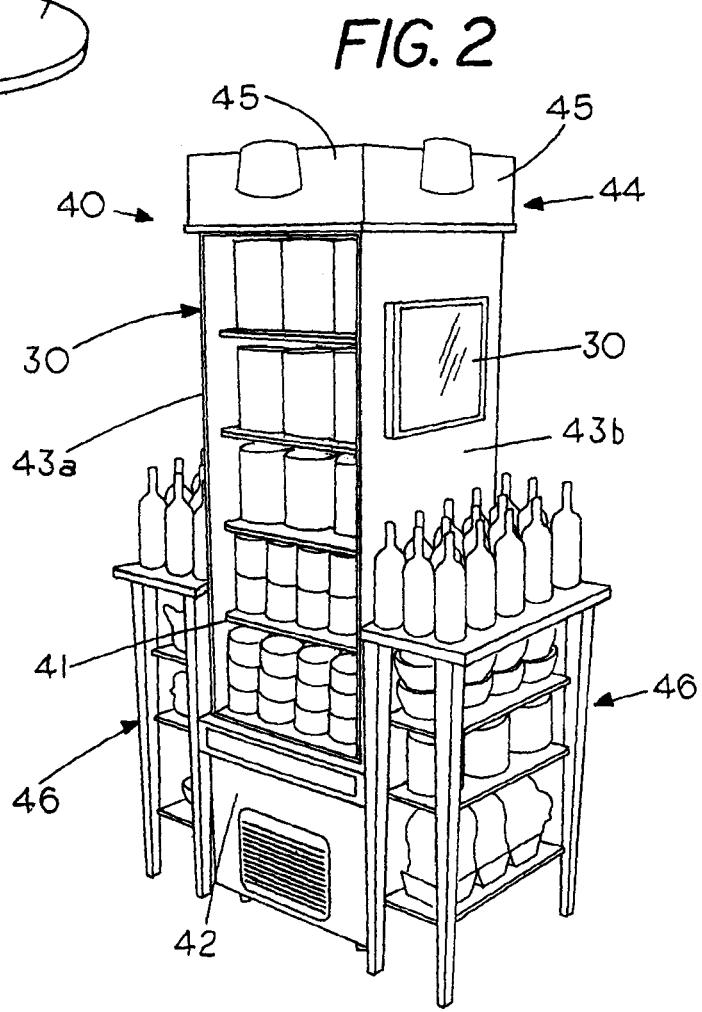
FIG. 2 is a perspective view showing a digital advertisement display stand comprising a refrigerated product display unit.

FIG. 2 is a perspective view showing an embodiment of a digital advertisement display stand comprising a refrigerated product display unit 40 that includes refrigerated product display spaces and a non-refrigerated display spaces. More specifically, refrigerated product display unit 40 includes an open face refrigerator 42 having a first side 43a and a second side 43b with each of the sides 43a, 43b supporting a live action monitor 30 thereon. Open face refrigerator 42 also includes refrigerated shelving 41 for receiving and displaying refrigerated products therein.

Refrigerated product display unit 40 also includes a top portion 44 for supporting multiple static displays 45 thereon. In the embodiment of FIG. 2 refrigerated product display unit 40 is shown including a non-refrigerated retail grocery endcap shelving 46 located adjacent each of the sides 43a, 43b of open face refrigerator 42.

Figure 3:
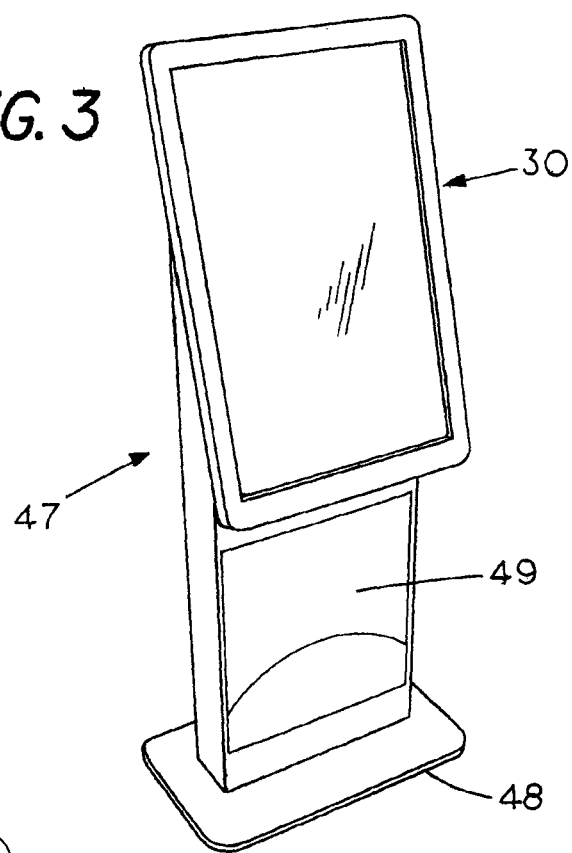
FIG. 3 is a perspective view showing a digital advertisement display stand comprising a tabletop or countertop surface supported portable kiosk.

FIG. 3 is a perspective view showing an embodiment of a digital advertisement display stand comprising a portable kiosk 47 sized and shaped for support on a tabletop or countertop support surface adjacent a location for displaying goods and services such as for example a refrigerated and/or frozen food product either inside a refrigerator or freezer retail display setting or outside but adjacent a refrigerator or freezer retail display setting. It is noted that portable kiosk 47 may include the feature of being weather sealed to protect portable kiosk 47 from possible damage resulting from moisture and fluctuations in temperature when used in the refrigerator and/or freezer retail display setting.

Portable kiosk 47 includes a base 48 supporting portable kiosk 47 on the tabletop or countertop support surface, a live action monitor 30 located within a customer's line of vision, which is defined as the straight line along which the customer looks, when in use and supported on the tabletop or countertop support surface adjacent the location for displaying goods and services. Being located within the customer's line of vision will promote the interaction between interested consumers and live action monitor 30 of portable kiosk 47 via touchscreen 31 of live action monitor 30 (shown in FIG. 1) and/or through a short wireless communication between live actions monitor 30 and a consumer's mobile device such a cellular phone. Although not shown, in order to provide greater portability to portable kiosk 47, portable kiosk 47 may also include a rechargeable lithium battery power supply located within kiosk 47 for powering live action monitor 30 and any other electrical component connected to kiosk 47. In addition kiosk 47 may also include a power connector jack for connecting kiosk 47 to a building outlet.

In the embodiment of FIG. 3, portable kiosk 47 also includes a static display 49 located a between base 48 and live action monitor 30.

Figure 4:
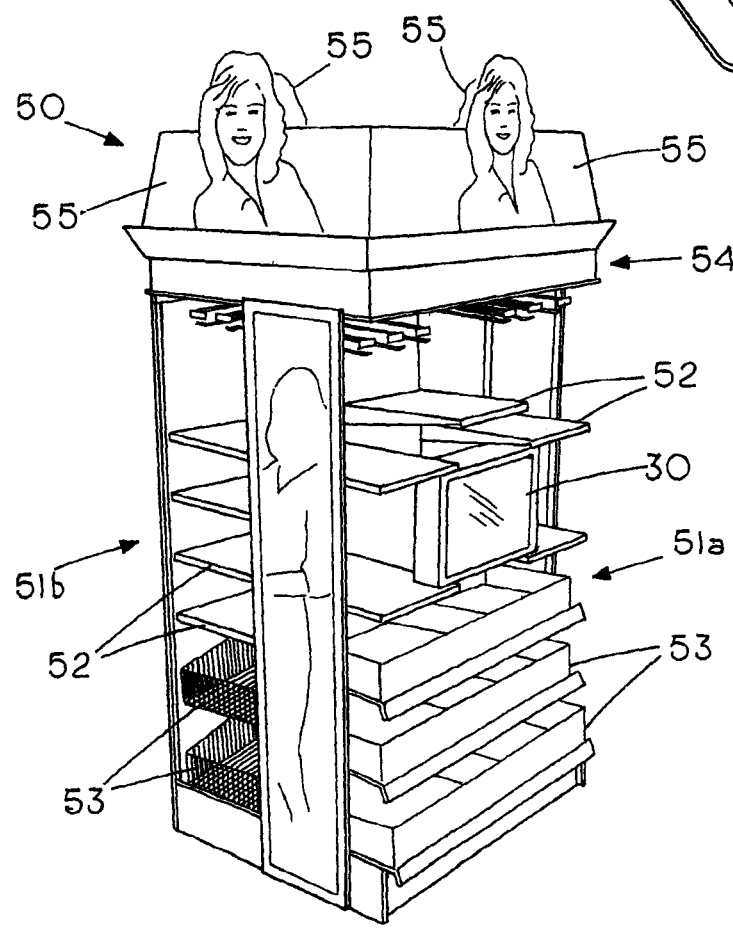
FIG. 4 is a perspective view showing a digital advertisement display stand comprising a retail dry food display rack.

FIG. 4 is a perspective view showing an embodiment of a digital advertisement display stand comprising a retail dry food display rack 50 having a first side 51a and a second side 51b with each of the sides 51a, 51b of retail dry food display rack 50 having a plurality of shelving 52 and draws/bins 53 attached thereto for supporting, displaying, and advertising goods and services thereon. Each of the sides 51a, 51b of retail dry food display rack 50 also include a live action monitor 30 centrally connected thereto and supported by shelving and position within a customer's line of vision.

Retail dry food display rack 50 further includes a four-sided top portion 54 located above plurality of shelving 52 and draws/bins 53 with each of the sides of top portion 54 supporting a static display 55 thereon.

Figure 5:
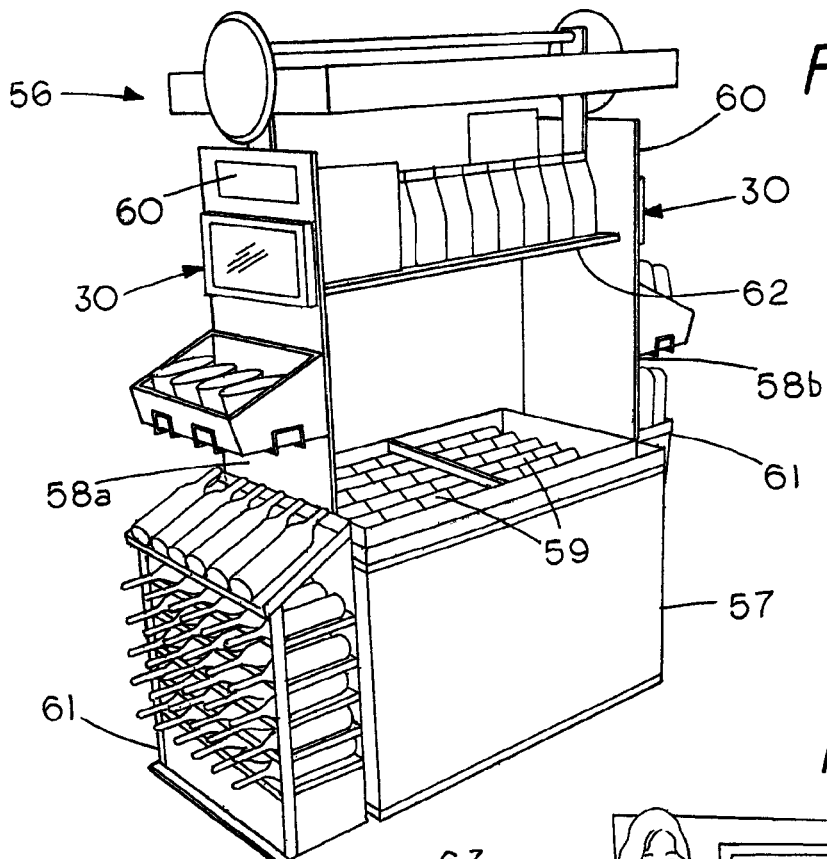
FIG. 5 is a perspective view showing a digital advertisement display stand comprising a refrigerated product display unit.

FIG. 5 is a perspective view showing an embodiment of a digital advertisement display stand comprising a refrigerated product display unit 56 that includes refrigerated product display spaces and a non-refrigerated display spaces. More specifically, refrigerated product display unit 56 includes a first side 58a and a second side 58b with each of the sides 58a, 58b supporting a live action monitor 30 located within a customer's line of vision thereon. Located on each of the sides 58a, 58b and above each of live action monitor 30 is a static display 60. Located between sides 58a, 58b is an open top refrigerator having refrigerated compartments 59 for receiving and displaying refrigerated products therein.

In the embodiment of FIG. 5 refrigerated product display unit 56 is shown including a non-refrigerated retail grocery endcap shelving 61 located adjacent each of the sides 58a, 58b of refrigerated product display unit 56. Refrigerated product display unit 56 also includes an unrefrigerated product display shelf 62 located above open top refrigerator 57 and extending from first side 58a and a second side 58b of refrigerated product display unit 56.

Figure 6:
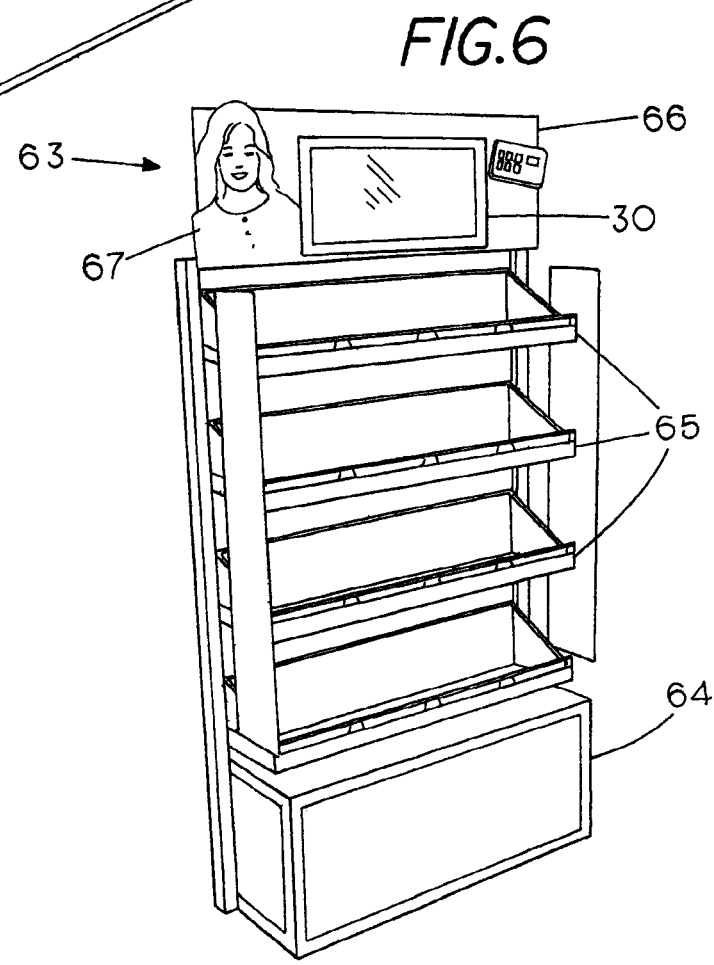
FIG. 6 is a perspective view showing a digital advertisement display stand comprising a retail dry food display endcap.

FIG. 6 is a perspective view showing an embodiment of a digital advertisement display stand comprising a retail dry food display endcap 63 having a base 64 supporting multiple shelving 65 for displaying retail dry food thereon. Retail dry food display endcap 63 also includes a riser 66 located above plurality of shelving 65 with riser 66 supporting a live action monitor 30 and a static display 67 thereon.

Figure 7:
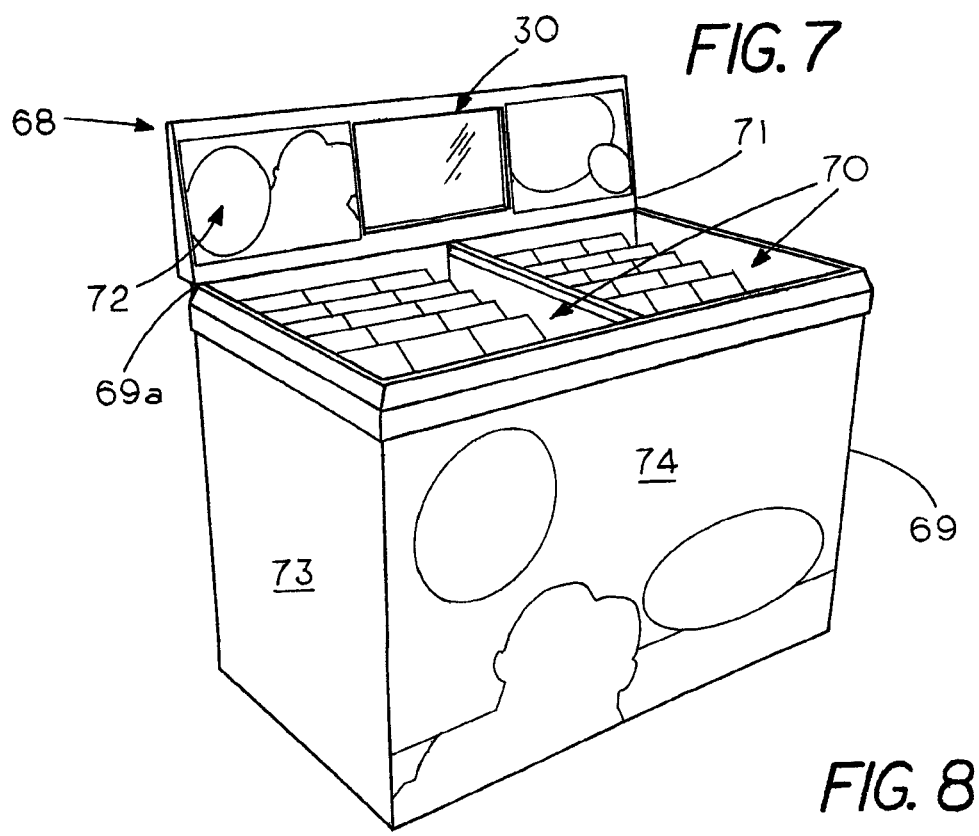
FIG. 7 is a perspective view showing a digital advertisement display stand comprising a freezer product display unit.

FIG. 7 is a perspective view showing an embodiment of a digital advertisement display stand comprising a freezer product display unit 68 that includes an open top freezer 69 having freezer compartments 70 for receiving and displaying frozen retail grocery products therein. Open top freezer 69 includes a riser 71 extending from a top end 69a of freezer 69 with riser 71 supporting live action monitor 30 and a static displays 72 thereon. In the embodiment of FIG. 7 open top freezer 69 also includes a plurality of static displays 73 and 74 located on an exterior surfaces of open top freezer 69.

Figure 8:
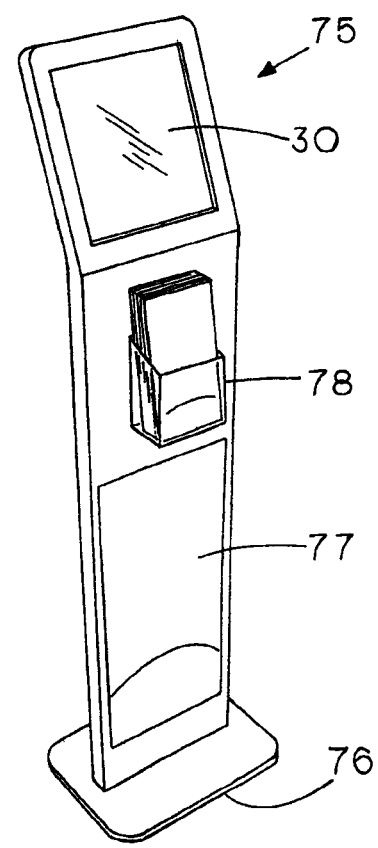
FIG. 8 is a perspective view showing a digital advertisement display stand comprising a floor surface supported portable kiosk.

FIG. 8 is a perspective view showing an embodiment of a digital advertisement display stand comprising a portable kiosk 75 sized and shaped for support on a floor support surface adjacent a location for displaying goods and services such as for example a frozen food product. Portable kiosk 75 includes a base 76 supporting portable kiosk 75 on the floor support surface, a live action monitor 30 located within a customer's line of vision, which is defined as the straight line along which the customer looks, when in use and supported on floor support surface adjacent the location for displaying goods and services. Similar to the portable kiosk 47 being located within the customer's line of vision will promote the interaction between interested consumers and live action monitor 30 of portable kiosk 75 via touchscreen 31 of live action monitor 30 (shown in FIG. 1) and/or through a short wireless communication between live action monitor 30 and a consumer's mobile device such a cellular phone. Although not shown, in order to provide greater portability to portable kiosk 75, portable kiosk 75 may also include a rechargeable lithium battery power supply located within kiosk 75 for powering live action monitor 30 and any other electrical component connected to kiosk 75. In addition kiosk 75 may also include a power connector jack for connecting kiosk 75 to a building outlet.

In the embodiment of FIG. 8 portable kiosk 75 is shown including a static display 77 and a static information holder 77 such as an informative brochure/pamphlet holder located a between base 76 and live action monitor 30.

Figure 9:
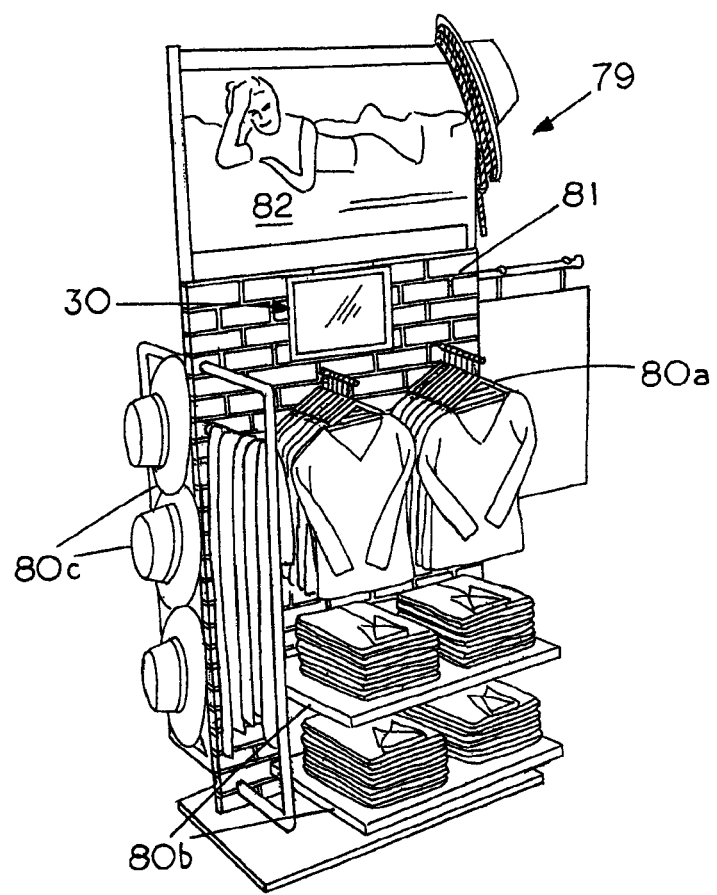
FIG. 9 is a perspective view showing a digital advertisement display stand comprising a retail clothing display rack.

FIG. 9 is a perspective view showing an embodiment of a digital advertisement display stand comprising a retail clothing display rack 79 having a plurality of clothing display rods 80a, clothing display shelving 80b, and clothing display hangers 80c attached thereto. Retail clothing display rack 79 is shown including a live action monitor 30 located on a top portion 81 of retail clothing display rack 79 above all of the displayed clothing and a static display 82 located above live action monitor 30.

In further regards to the live action monitor 30 of FIGS. 1-9, although live action monitor 30 may include a power connector jack for connecting live action monitor 30 to a power source such as an electrical outlet to power live action monitor 30, in order to provide greater flexibility to the digital advertisement display stand of FIGS. 1-9 while potentially reducing the continuous need for connection to the building electrical outlet to, live action monitor 30 may additional include a rechargeable power supply such as for example a rechargeable lithium battery power supply connected to or located within live action monitor 30.

Figure 10:
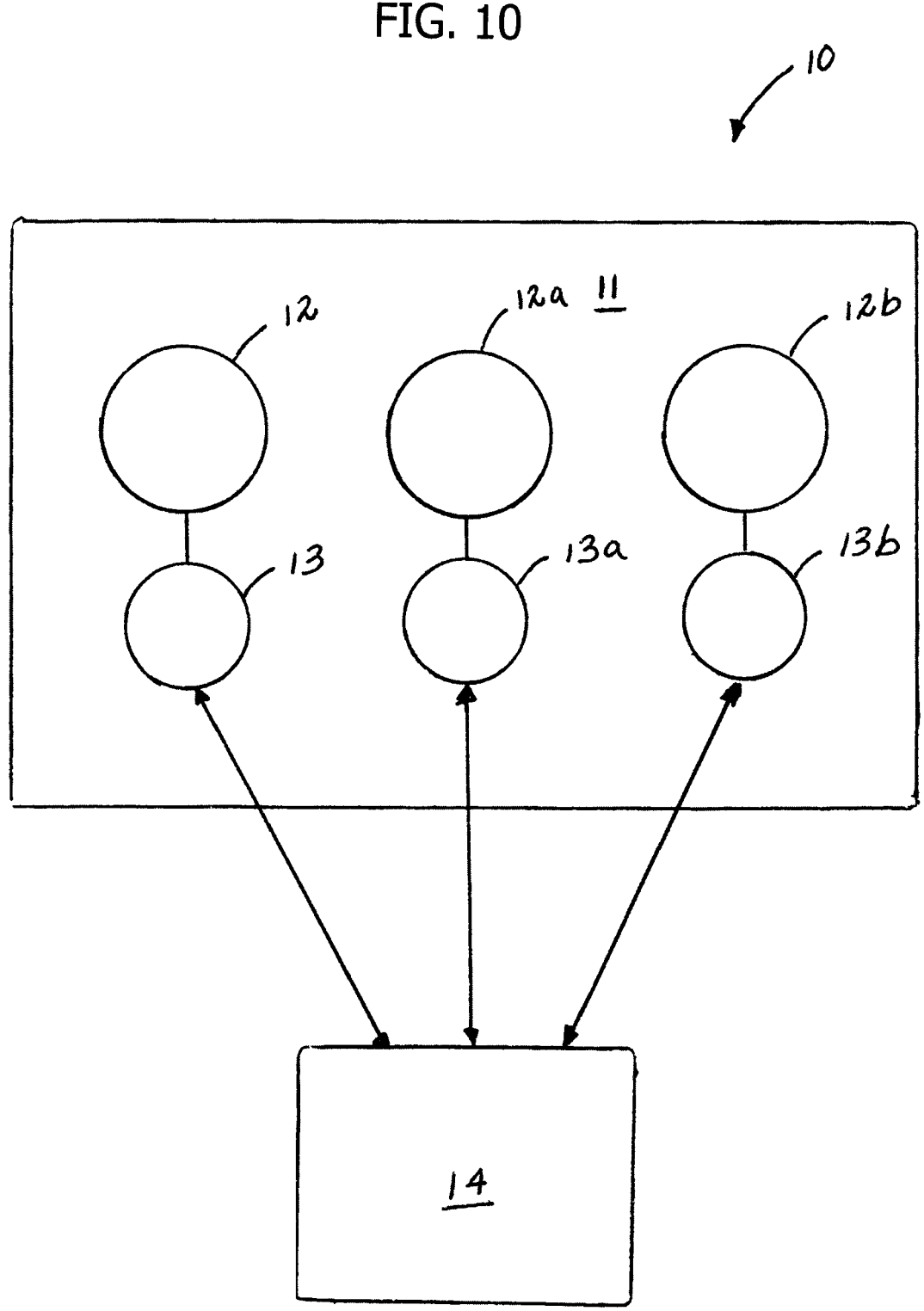
FIG. 10 shows a schematic of an embodiment of my digital advertising cellular display system.

FIG. 10 shows a schematic of an embodiment of my digital advertising cellular display system 10. Reference numeral 11 indicates a retail outlet that may be up to 40,000 square feet or larger having a plurality of locations for displaying goods and services for purchase 12, 12a, and 12b. Located proximal each of the locations for displaying goods and services for purchase 12,12a, 12b is an electronic display means 13,13a, 13b for displaying and communicating consumer products and product attributes on behalf of a brand and/or retailer and services information images, videos, and audios about the products and/or services located nearby. It is noted that in the present invention the term electronic display means and the term live action display comprise the same or similar component and function and thus may and be referred to and used interchangeable with each other.

The electronic display means 13, 13a, 13b are shown in wireless communication with an off-site control center 14 to enable the transmittance of control information and real-time product and services advertisement and product and services information between the offsite control center 14 and the electronic display means 13, 13a, 13b.

It is noted that the offsite control center 14 may control information and real-time product and services advertisement and product and services information of the electronic display means 13, 13a, 13b from as few as one retail location to a chain of retail locations. Having one offsite control center 14 controlling information of the electronic display means 13, 13a, 13b of a chain of retail locations provides the benefit of consistency of information among all of the retail change sites while greatly reducing the labor and employee time spent in changing information compared to previous physical methods and static devices used to convey information to potential consumers.

Electronic display means 13, 13a, 13b may each comprise an individual screen or a component of a larger display systems that includes a plurality of LCD/LED display screens built into case headers, a plurality of free standing interactive kiosks, countertop displays fixtures and temporary and permanent displays screens.

FIG. 10 shows digital advertising cellular display system 10 in which single offsite control center 14 is in wireless communication with all of electronic display means 13, 13a, 13b for transferring control information and product and services advertisement and product and services information between single offsite control center 14 and each of electronic display means 13,13a, 13b.

Figure 11:
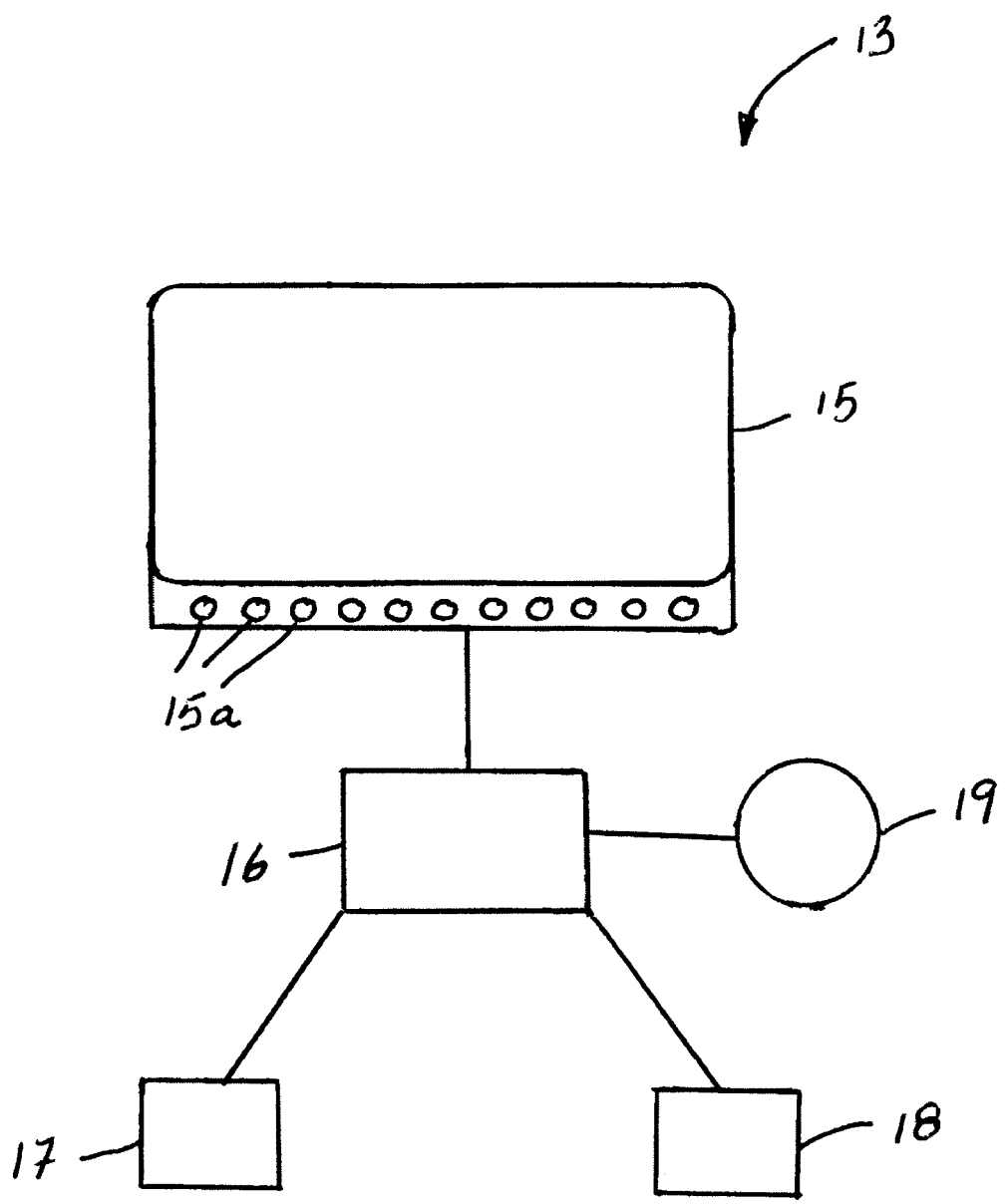
FIG. 11 shows a schematic of an embodiment of a electronic display means of FIG. 11.

FIG. 11 shows a schematic of an embodiment of the electronic display means 13 of FIG. 10. As shown electronic display means 13 includes a LCD/LED display screen 15. Although not required, LCD/LED display screen 15 includes touch screen control and push buttons 15a addressability by consumers and retailers to provide for interactivity between a potential purchaser and LCD/LED display screen 15. As an alternative to push buttons 15a, LCD/LED display screen 15 may comprise a touch response screen.

As a secondary option electronic display means 13 may also include a method of communication by consumers and retailers through electronic display mean 13 and the consumer's mobile devices including but not limited to cellular phones and tablets. The communication between electronic display mean 13 and the consumer's mobile devices may include the share of information at distances of less than 4 centimeters with communication speed of 424 kbps to limit access of consumer information to provide for added security.

The interactivity between the potential purchaser and LCD/LED display screen 15 may include the displaying of potential purchaser's specifically requested content including contents that are uploaded on demand via the internet, independently by electronic display means 13 if desired, and immediately played or displayed on LCD/LED display screen 15 for the potential purchaser.

As part of the interactivity between the potential purchaser and LCD/LED display screen 15 a retail relationship may be established with the potential purchaser by providing the potential purchaser with an opt-in feature during which information may be exchanged between the potential purchaser and the electronic display means 13 via LCD/LED display screen 15. The exchange of information may include but is not limited to the potential purchaser providing the electronic display means 13 with product preferences and personal information such as email address(es), home address(es), and phone numbers. The exchange of information enables the retailer to use the potential purchaser's data for present and future use such as delivering certain types of promotional retail benefits and or value to the potential purchaser either at the current time or site purchasing and/or in the future to promote sales.

As a supplement to the above, multiple interactivity between the potential purchaser and LCD/LED display screen 15 for different products may result in the building of data on the specific potential purchaser relating to the type of food and products and the volume of food and products that the potential purchaser uses and consumes and other retail habits of that specific potential purchaser. The data volume of data collected, which if processed by the retailer, may result in the formation of a retail avatar or retail profile of the specific potential purchaser based on the potential purchaser's email address, home address, and/or phone number.

Electronic display means 13 also includes a central processing unit 16 located therein for processing information, a memory storage unit such as flash memory storage 17 located in electronic display means 13 and connected to central processing unit 16, and a wireless data transmission device such as a 3G/4G/4G LTE cellular phone chip 18 also located in electronic display means 13 and connected to central processing unit 16 for providing wireless communication with an off-site control center 14 and allowing access to the internet for data transfer. An example of a central processing unit that is currently available would be the Snapdragon™ S4 Processors manufactured by Qualcomm®, a corporation headquartered in San Diego, Calif., USA.

Electronic display means 13 may also include the implementation and use of other mobile communication technologies including but not limited to NFC (Near Field Communication), SMS, packet-based connections, Bluetooth, Bluetooth Low Energy, RFID, GPS and a blending of other emerging technologies.

Although not require electronic display means 13 is shown also including a motion-sensing device 19 connected to central processing unit 16 for allowing the display of content when consumers are nearby while maintaining the display of content on standby when consumers are distal to electronic display means 13 in order to not only reduce power consumption but also to provide for a focused message(s) to the consumer so that the consumer is less likely to be overwhelmed by a plurality of messages in the consumer's distal visual line of sight.

Figure 12:
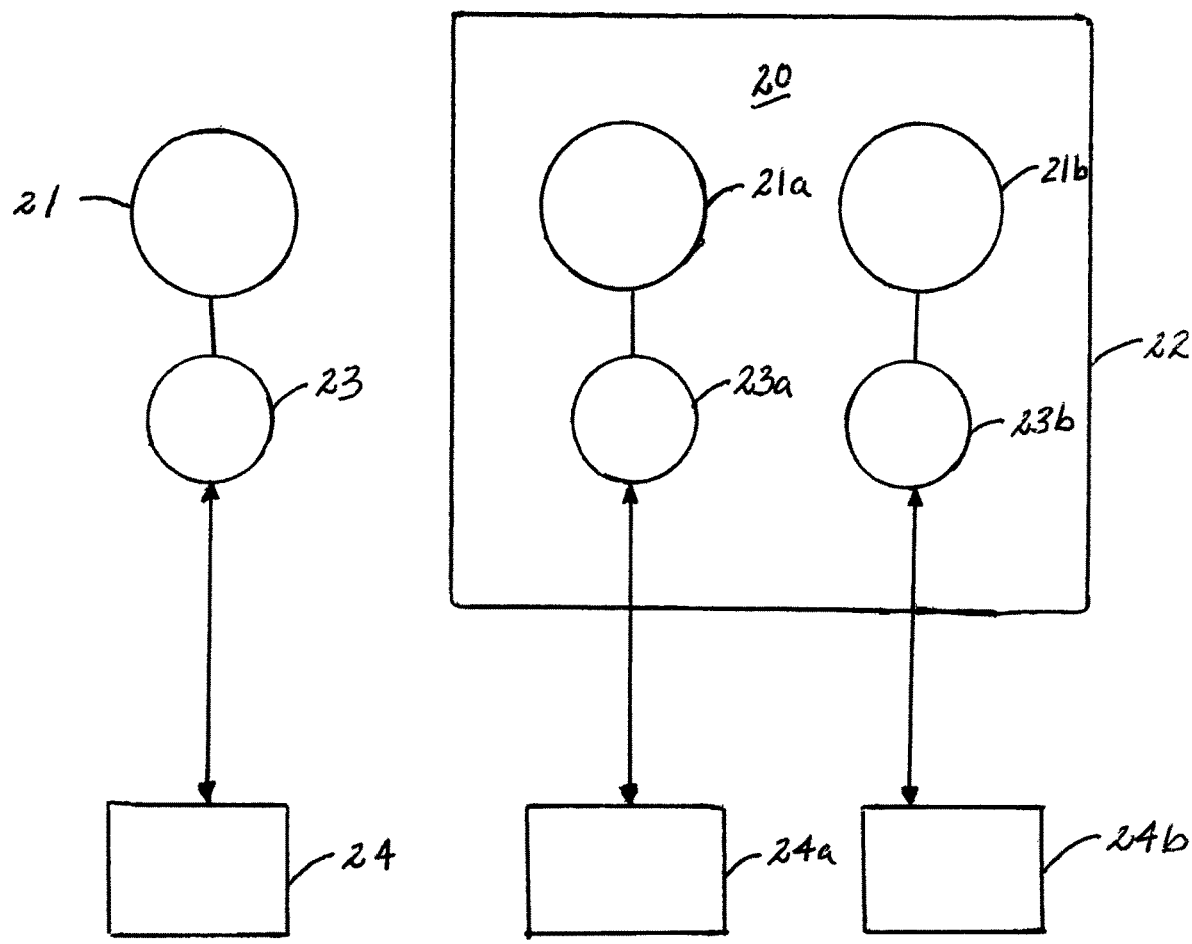
FIG. 12 shows a schematic of an alternative embodiment of my digital advertising cellular display system.

FIG. 12 shows a schematic of an alternative embodiment of my digital advertising cellular display system 19 having similar component to digital advertising cellular display system 10 in that digital advertising cellular display system 19 includes a retail outlet 20 having a first location for displaying goods and services for purchase 21, a second location for displaying goods and services for purchase 21a, and a third location for displaying goods and services for purchase 21b. Located proximal first location 21 is a first electronic display means 23, located proximal second location 21a is a second electronic display means 23a, and located proximal third location 21b is a third electronic display means 23b.

Note however that unlike digital advertising cellular display system 10, second location for displaying goods and services for purchase 21a, and third location for displaying goods and services for purchase 21b are both located within housing or building 22 while first location for displaying goods and services for purchase 21 is located outdoors.

In additional, unlike digital advertising cellular display system 10, each of the electronic display means 23, 23a, 23b are in independent wireless communication with a corresponding offsite control center. More specifically, first electronic display means 23 is shown in independent wireless communication with a first offsite control center 24, second electronic display means 23a is shown in independent wireless communication with a second offsite control center 24a third electronic display means 23b is shown in independent wireless communication with a third offsite control center 24b for transferring control information and product and services advertisement and product and services information between the electronic display mean 23, 23a, 23b and their corresponding offsite control centers 24, 24a, 24b to provide for interactivity between a potential purchaser and said electronic display. The phrase independent wireless communication as referred to the wireless communication between each of the electronic display mean 23, 23a, 23b and their corresponding offsite control centers 24, 24a, 24b is understood as each of the electronic display mean 23, 23a, 23b and their corresponding offsite control centers 24, 24a, 24b being wireless connected and in communication by a unique wireless frequency or the like that may only be received and transmitted by the electronic display mean 23, 23a, 23b and their corresponding offsite control centers 24, 24a, 24b, similar to a wireless connection between two cellular phones, to prevent cross-over in communication between a electronic display mean and a non-corresponding offsite control centers.

I claim:

1. A digital advertisement display stand comprising:

a retail food display rack that includes an open top refrigerator having refrigerated product display spaces therein and a non-refrigerated display spaces, said non-refrigerated display space including at least one retail grocery display endcap having multiple shelving connected thereto;

at least one static advertisement display located on said retail food display rack;

at least one consumer product video and audio content displaying live action monitor connected to said retail food display rack and located directly above said open face refrigerator and at least one consumer product video and audio content displaying live action monitor connected to said retail food display rack and located directly above said shelving of said retail grocery display endcap, said consumer product video and audio content displaying live action monitors each having a touch screen located directly on said consumer product video and audio content displaying live action monitor Previously Presented and providing interactivity including uploaded on demand content between a potential purchaser and said consumer product video and audio content displaying live action monitor, a central processing unit located in said consumer product video and audio content displaying live action monitors, a memory storage unit connected to said central processing unit, a long distance wireless data transmission device connected to said central processing unit, a motion-sensing device allowing the display of video and audio consumer product content when consumers are nearby to reduce power consumption, and a short distance wireless data transmission device providing for short wireless communication between said live action monitors and a consumer's mobile device; and at least one offsite control center in wireless communication with said long distance wireless data transmission device of said live action monitors.

2. The digital advertisement display stand of claim 1 wherein said retail food display rack comprises a two-sided retail dry food display rack with each of said side of said retail dry food display rack having a plurality of shelving and bins attached thereto for supporting, displaying, and advertising goods and services thereon and a live action monitor centrally connected thereto and supported by said shelving.

* * * * *